US005557837A

United States Patent [19]
Thiard-Laforet et al.

[11] Patent Number: 5,557,837
[45] Date of Patent: Sep. 24, 1996

[54] METHOD FOR REPAIRING STATOR WINDING BARS

[75] Inventors: Alfred Thiard-Laforet, Midlothian, Va.; Wilibald Zerlik, Birr, Switzerland

[73] Assignee: ABB Management AG, Baden, Switzerland

[21] Appl. No.: 415,362

[22] Filed: Apr. 3, 1995

[30] Foreign Application Priority Data

Jan. 26, 1995 [DE] Germany .................. 195 02 308.0

[51] Int. Cl.⁶ .................................................. H02K 15/14
[52] U.S. Cl. .................... 29/596; 29/402.05; 29/402.16; 228/165; 228/170; 310/54; 310/60 A
[58] Field of Search ..................... 29/596, 598, 402.08, 29/402.16; 310/54, 59, 60; 228/165, 170

[56] References Cited

PUBLICATIONS

In-Place Brazing Solution To Liquid Cooled Stator Winding Leaks, James K. Taillon et al, Mechanical Dynamics and Analysis (MDA), pp. 1–5.

*Primary Examiner*—Carl E. Hall
*Attorney, Agent, or Firm*—Oblon, Spivak, McClelland, Maier, & Neustadt, P.C.

[57] ABSTRACT

The method for repairing a connecting device for the electrical connection and for supplying and carrying away the coolant to and from the hollow conductor elements of the stator winding bars of electrical machines includes removal of the existing connecting device (2) from the bar end by inductive heating; cleaning the bar end in the region where the new connecting device is intended to be mounted; material-cutting machining the end surface of the bar end; introducing narrow slots (7) between adjacent conductor elements (1) into the end of the bar in the transverse and vertical directions; pushing on a first connecting part (2a) which is made of copper and completely surrounds the bar end; filling remaining gaps between the first connecting part (2a) and the outer surfaces of the bar end with copper foil and/or solder foil; filling the narrow slots (7) with copper foil and/or solder foil (10) or a combination of both; inductive heating of the first connecting part (2a) and of the bar end and soldering with the addition of solder; inspecting the solder joint thus created; fitting a second connecting part (2b) made of copper to the free end surface of the first connecting part (2a) by soldering; and testing the sealing of the resulting connecting device (2a,2b).

4 Claims, 5 Drawing Sheets

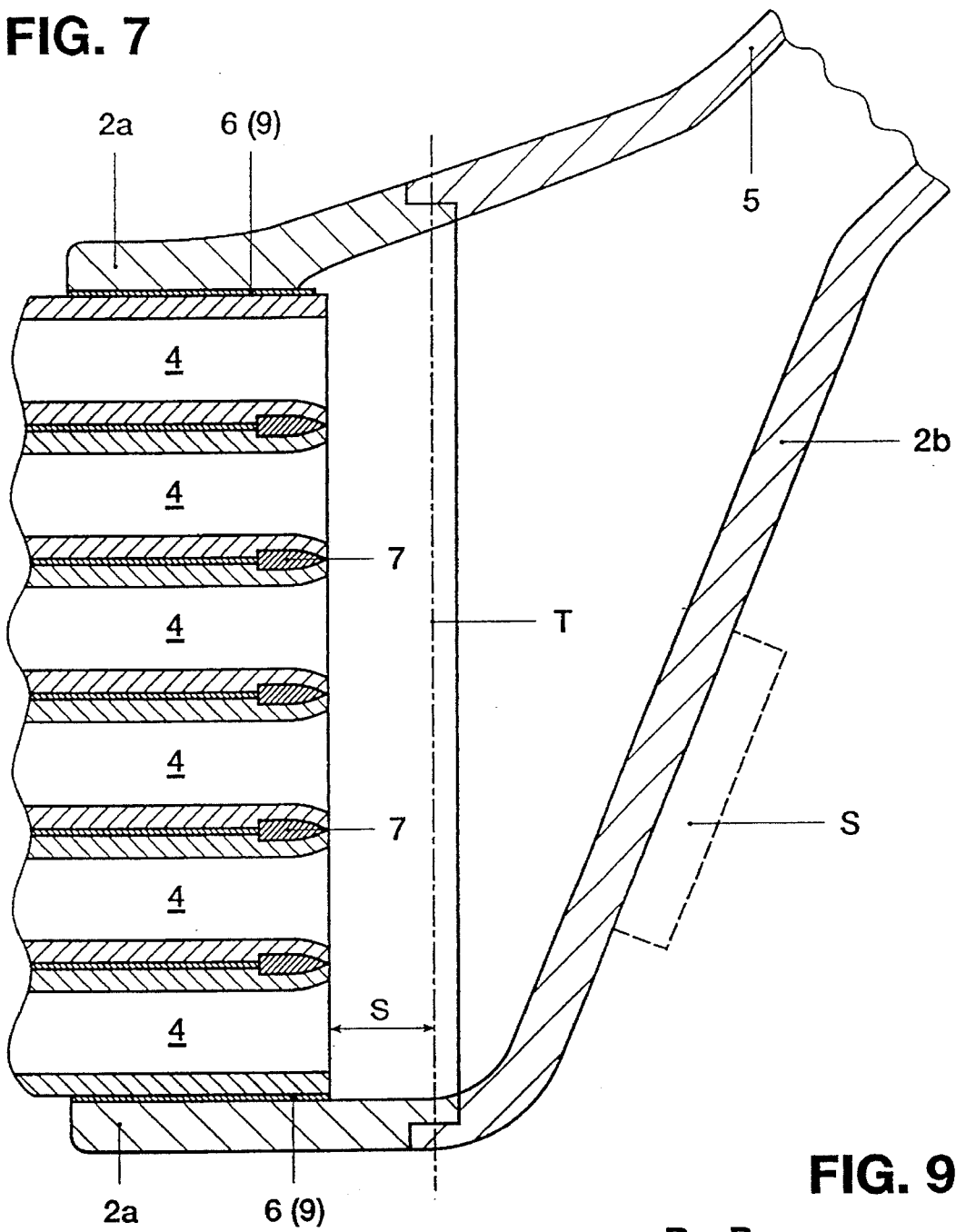
FIG. 7
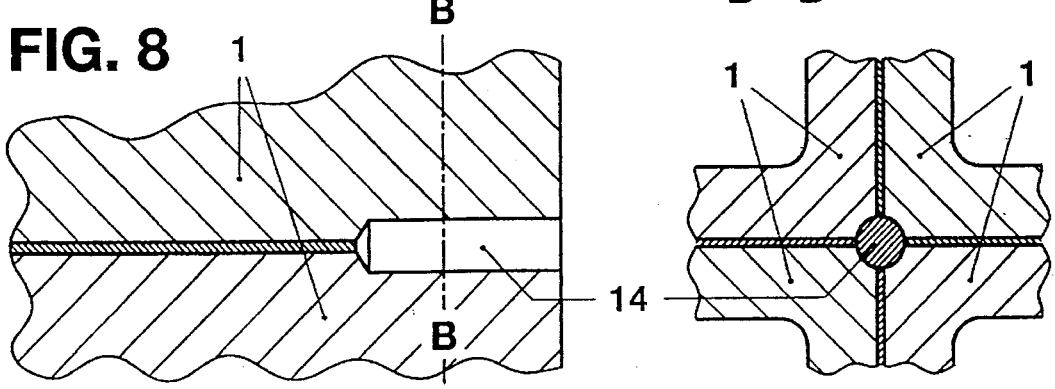
FIG. 8
FIG. 9

_5,557,837_

METHOD FOR REPAIRING STATOR WINDING BARS

BACKGROUND OF THE INVENTION

1. Field of the Invention

The invention relates to a method for repairing a connecting device for the electrical connection and for supplying and carrying away the coolant to and from the hollow conductor elements of the stator winding bars of electrical machines, in the case of which connecting device the hollow conductor elements and, if appropriate in the case of a stator winding which also comprises solid conductor elements as well as hollow conductor elements, all the conductor elements are surrounded by a metallic component and are soldered thereto and to one another, which component overhangs the conductor elements forming a water chamber and ends in a connecting fitting for coolant supply and carrying the coolant away.

2. Discussion of Background

In the stator winding overhang of water-cooled electrical machines, the coolant is supplied from annular header lines via insulating hoses to the so-called water chambers at the end of the conductor bars. The water chamber is formed by a connecting device in which the hollow conductor elements are surrounded by a metallic component and are soldered thereto and to one another. The metallic component overhangs the conductor elements to form this water chamber. It ends in a connecting fitting for coolant supply and carrying coolant away. The connecting device is at the same time also used as the electrical connection.

The connecting device is subject to high mechanical loads (vibration) during operation. Even very small leakages lead to consequential damage to the electrical machine. If such damage occurs, the solder joints—if at all possible—must be replaced. In general, only the removal or even the complete replacement of the stator winding remains. There is thus a major requirement for a repair method which can be carried out without removal of the stator winding.

SUMMARY OF THE INVENTION

Accordingly, one object of the invention is to provide a novel method for repairing a connecting device of the generic type mentioned initially, which method can be carried out easily and manages without removal or even replacement of the stator winding, but at the same time makes possible leakage-free solder joints.

This object is achieved according to the invention by a repair method which comprises the following steps:
removal of the existing connecting device from the bar end by inductive heating;
cleaning the bar end in the region where the new connecting device is intended to be mounted;
material-cutting machining of the end surface of the bar end, especially by milling;
introducing narrow slots between adjacent conductor elements into the end of the bar in the transverse direction and vertical direction;
pushing on a first connecting part which completely surrounds the bar end;
filling remaining gaps between the first connecting part and the outer surfaces of the bar end with copper foil and/or solder foil;
filling the narrow slots, which have been introduced into the end of the bar, with copper foil and/or solder foil;
inductive heating of the first connecting part and of the bar end and soldering with the addition of solder;
at least visual inspection of the solder joint thus created;
fitting a second connecting part to the free end surface of the first connecting part by soldering;
testing the sealing of the connecting device created in this way.

The invention is in this case based on the idea of managing with a minimum of modifications to the existing connecting device and at the same time retaining inspection of the quality of the repair measures at any time. This includes, inter alia, the deliberate creation of clean, defined, comparatively large-area solder points and the capability to fill the resulting gaps with filling strips made of copper and solder, or a combination of both, such that only extremely small gaps still remain which are later filled without any residue during soldering, as a result of the capillary effect. Furthermore, the splitting of the connecting device in two is to be emphasized, which allows accessibility, and thus the capability to inspect the solder joints to be created, at any time. This splitting in two furthermore makes possible great flexibility in the design of the two connecting parts, particularly with respect to their separating surfaces, as well. The latter can be designed such that, on the one hand, the soldering/testing of the first connecting part can be carried out easily whereas, on the other hand, the second connecting part makes possible the connection to the existing coolant lines as well as to the electrical connections virtually "seamlessly".

Exemplary embodiments of the invention and further advantages which can be achieved thereby are explained in more detail in the following text, with reference to the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 shows a longitudinal section through a two-piece connecting device as is used for the repair method according to the invention, the hollow conductor ends subsequently having been widened, as a modification to FIGS. 5 and 6;

FIG. 8 shows a longitudinal section through the bar end of FIG. 7 close to the end surface, after the introduction of holes at the meeting point of four hollow conductors, and subsequent filling of these holes with copper round material;

FIG. 9 shows a cross section through the bar end according to FIG. 8, along the line BB in said figure.

DESCRIPTION OF THE PREFERRED EMBODIMENTS

Figure 1:
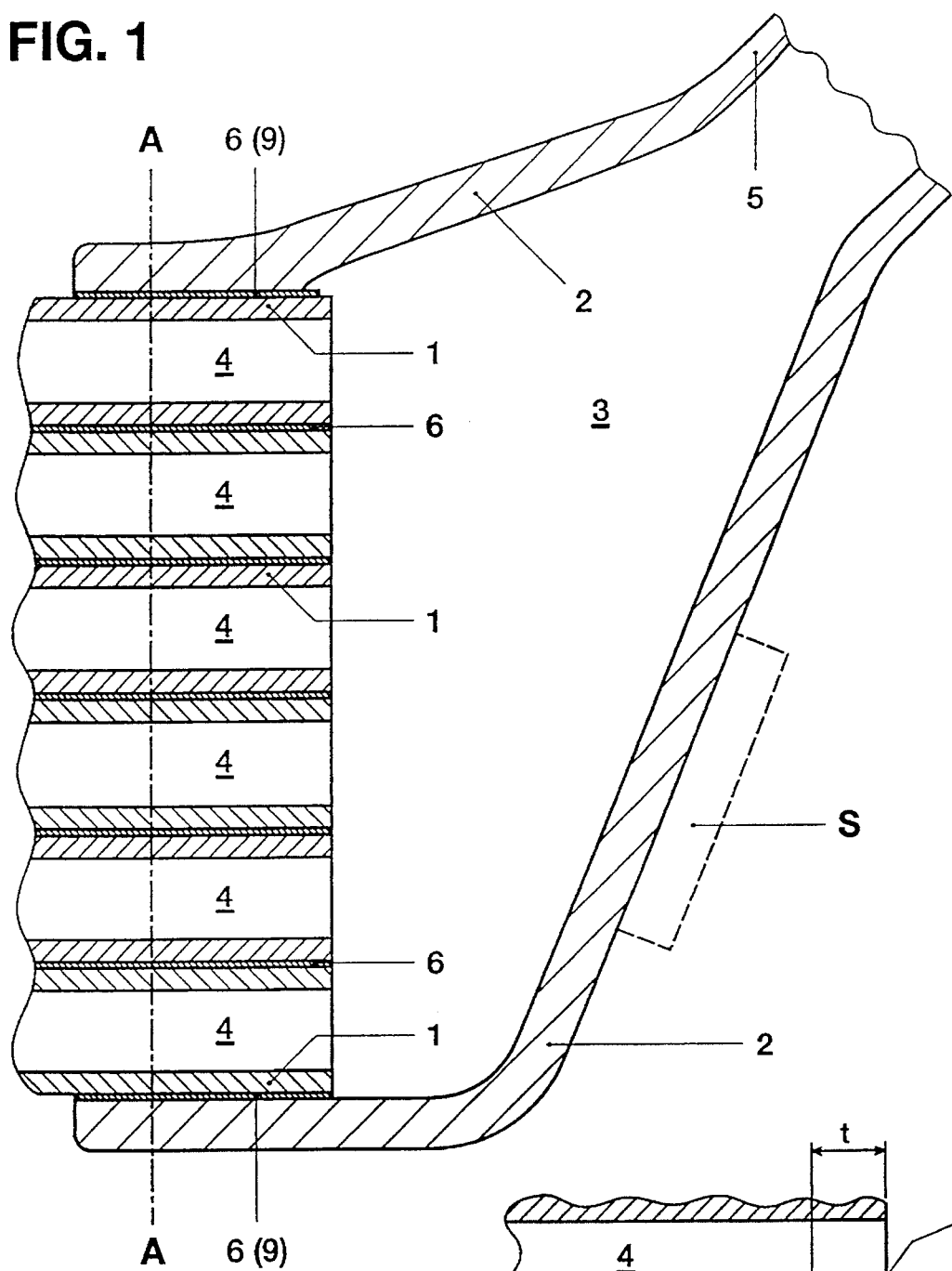
FIG. 1 shows a longitudinal section through a known connecting device for the electrical connection and for supplying and carrying away the coolant to and from the hollow conductor elements of the stator winding bars of electrical machines.
Figure 2:
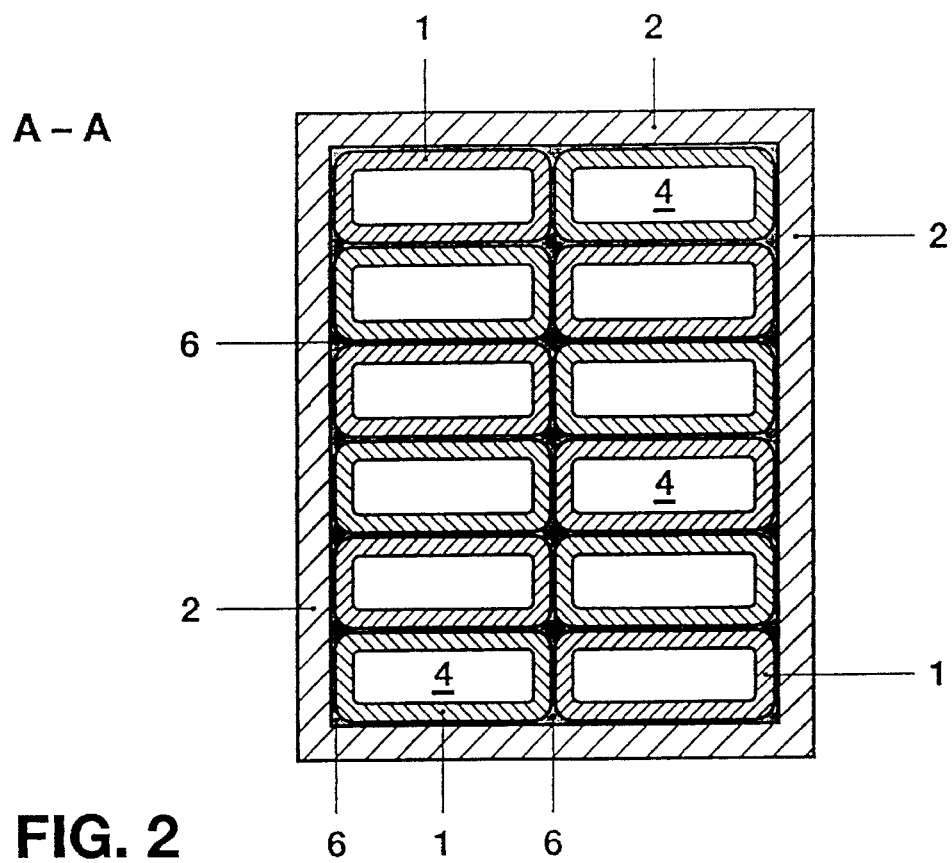
FIG. 2 shows a cross section through the connecting device according to FIG. 1, along the line AA in said figure.

Referring now to the drawings, wherein like reference numerals designate identical or corresponding parts throughout the several views, the object used as the basis for the repair method which is to be described in the following text is a known connecting device for the electrical connection and for supplying and carrying away the coolant from the hollow conductors of the stator winding bars of an electrical machine, as is illustrated schematically in FIGS. 1 and 2.

The stator winding bar which, in the case of the example, is constructed only from hollow conductor elements 1 is provided at its end with a connecting device in the form of a metallic component 2. The latter surrounds the totality of all the conductor elements 1, overhangs them externally to form a water chamber 3 into which the cooling channels 4 open into the conductor elements 1, and ends in a connecting fitting 5 for coolant supply and carrying the coolant away. The conductor elements 1 are silver-soldered to one another and to the metallic component. The solder gaps, which are illustrated excessively large in FIG. 1 and FIG. 2 and are filled with solder are designated by 6. The electrical connection S (indicated by dashed lines in FIG. 1) of the connecting device is located in the case of the example on the outside of the water chamber 3, and has been omitted in FIG. 1 because it is not necessary for understanding of the invention.

After the machines have been operated for a relatively long time, leakages can now occur at the solder joints. The wall of the water chamber 3 itself can also become unsound if—as is normal in a large number of relatively old machines—it is made of cast copper. The consequence is that cooling water passes into the winding overhang space or—as is far more dangerous—into the conductor bar, which must be avoided under all circumstances. Because of the confined spatial conditions in the winding overhang space, the replacement of such connecting devices is extremely tiresome. As a rule, removal of the stator winding is not possible, for economic reasons. The invention now comes into play here.

The repair method according to the invention is presented in summary form as follows, and comprises essentially the following method steps:

a) removal of the existing connecting device (metallic component 2) from the bar end by inductive heating;
b) cleaning the bar end in the region where the new connecting device is intended to be mounted;
c) material-cutting machining of the end surface of the bar end, especially by milling;
d) introducing narrow slots 7 between adjacent conductor elements 1 into the end of the bar in the transverse direction and vertical direction in order to remove "old" solder between the conductor elements down to a predefined depth;
e) pushing on a first connecting part 2a which is made of copper and completely surrounds the bar end;
f) filling remaining gaps between the first connecting part 2a and the outer surfaces of the bar end with copper foil and/or solder foil;
g) filling the narrow slots 7, which have been introduced into the end of the bar, with copper foil and/or solder foil or a combination of both;
h) inductive heating of the first connecting part 2a and of the bar end and soldering with the addition of solder;
i) at least visual inspection of the solder joint thus created;
j) fitting a second connecting part 2b made of copper to the free end surface of the first connecting part 2a by soldering;
k) testing the sealing of the connecting device created in this way.

In step a), the metallic component 2 is heated by inductive means to the melting temperature of the solder and is pulled off the bar end. Devices for deliberate local heating of components and solder joints are covered by the prior art and for this reason are not explained in more detail.

This is followed, as step b), by the mechanical cleaning of the solder points, which can be done, for example, by brushing or polishing. In this case, the exfoliated material and porous old solder are removed down to the bare copper or bare solder.

After this—step c)—the end surface of the conductor bar is machined by metal-cutting machining, preferably by milling, until a clean copper surface is achieved.

Figure 4:
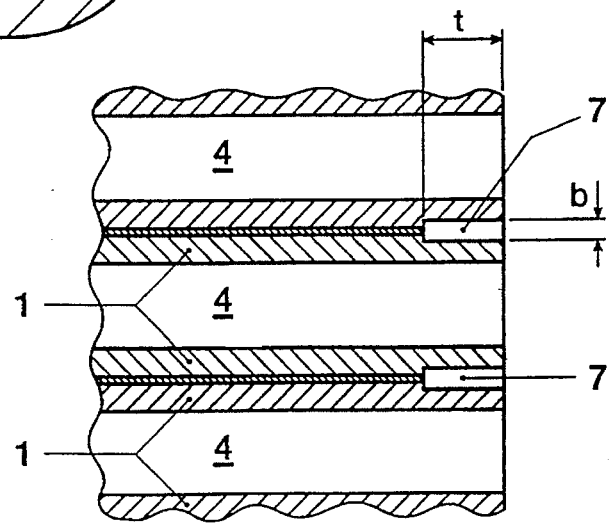
FIG. 4 shows a longitudinal section through the bar end according to FIG. 3.
Figure 3:
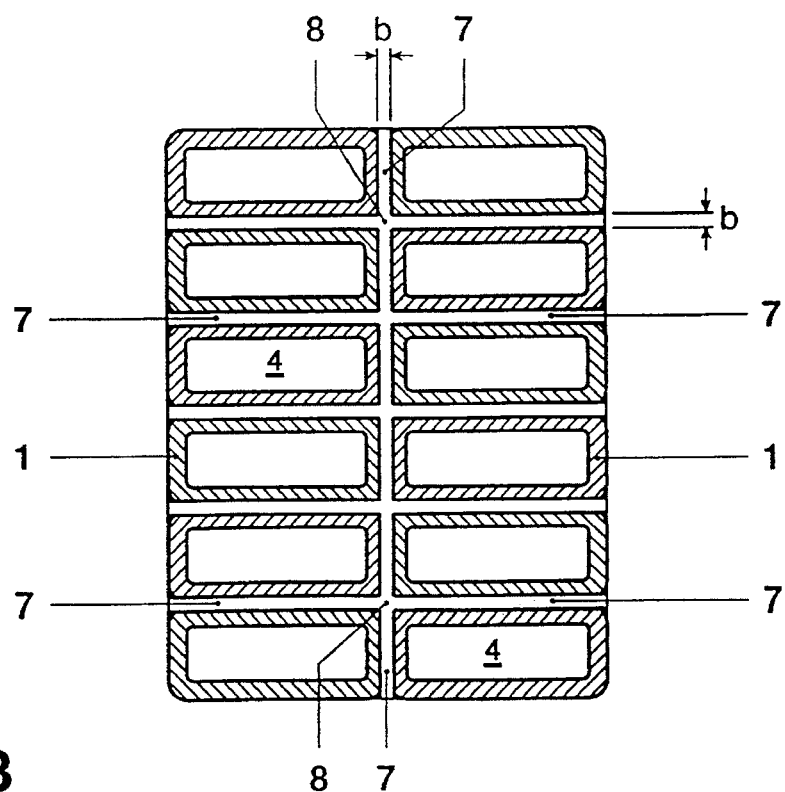
FIG. 3 shows a cross section through the bar end close to the end surface after the introduction of slots between adjacent conductor elements.

In step d), narrow slots 7 having a width b≈0.5 mm and a depth t≈10–15 mm are introduced into the former solder gaps between mutually adjacent conductor elements 1, as is illustrated in FIGS. 3 and 4. This can be done using a side-milling cutter which is mounted on an auxiliary device at the bar end. The essential feature in this case is that the width b of the slots is dimensioned such that the outer wall of the hollow conductor elements is also included in the milling process, so that the side wall of the slot 7 is machined, except for the conductor copper, as far as the crossing points 8 where four conductor elements abut against one another.

Figure 10:
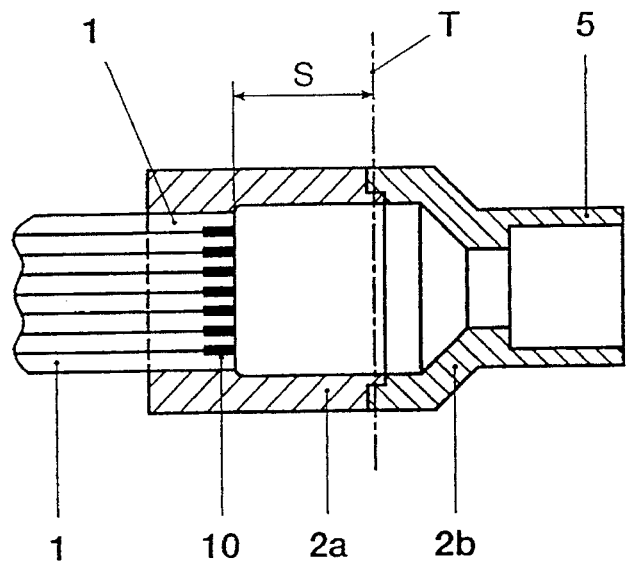
FIG. 10 shows a longitudinal section through a connecting device in which the separating surface between the two connecting parts is laid in the direction of the connecting fitting.

In step e), one half 2a of a metallic connecting part is now pushed onto the bar end which has been prepared in this manner. This half is manufactured from solid, rolled copper and is brought to the corresponding shape by metal-cutting machining; it is thus not a casting. The dimensions of the hole in this first half at the end of the bar side largely correspond to the original bar end. It overhangs the bar end by a certain amount s. Taking into account the subsequent fitting of the second connecting part 2b, the excess amount should be selected to be as large as possible, as will be explained later in conjunction with FIG. 10.

Gaps which possibly still remain between the inner wall of the first connecting part 2a and all the outer surfaces of the conductor bar are now (step f) filled with first filling strips 9. These first filling strips 9 have become known under the designation SILFOS and are offered in a wide range of compositions and thicknesses between 0.1 mm and 1 mm. If required, copper-foil strips can also additionally be used in order to fill relatively large gaps as completely as possible as well.

Figure 6:
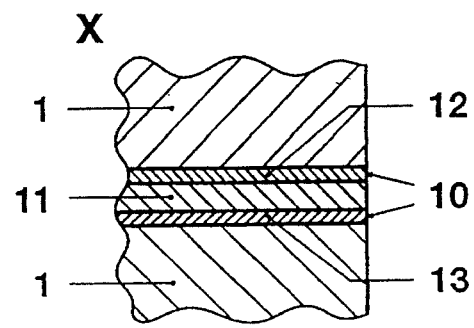
FIG. 6 shows the detail X from FIG. 5 on an enlarged scale.

The slots 7 are now filled with second filling strips 10, in step g). Since the slot width b (to be filled) is now produced by the milling tool and is thus defined, filling strips 10 are preferably considered here which comprise a central copper layer 11 with solder layers 12, 13 arranged on both sides, as can be seen from the detailed illustration in FIG. 6. This results in the solder gaps being kept as small as possible, so that all the gaps are filled during the soldering process, as a result of the capillary effect.

The bar end prepared in this way with the first connecting part 2a pushed on is now inductively heated and soldered, with the addition of solder (step h). If carried out carefully, there is no risk of solder penetrating into the cooling channels 4 and solidifying there, since the bar ends run horizontally. This risk also therefore does not exist because the inner wall of the cooling channels would have been coated with an oxide layer during the preceding operation, which prevents wetting by the solder.

After the soldering of the first connecting part 2a, all the solder points are now inspected and investigated for freedom from porosity, in step i). A sealing test can optionally be carried out even at this stage, for example by provisional closure of the first connecting part and pressing off, for example using helium gas, for example from the other side of the machine.

Figure 5:
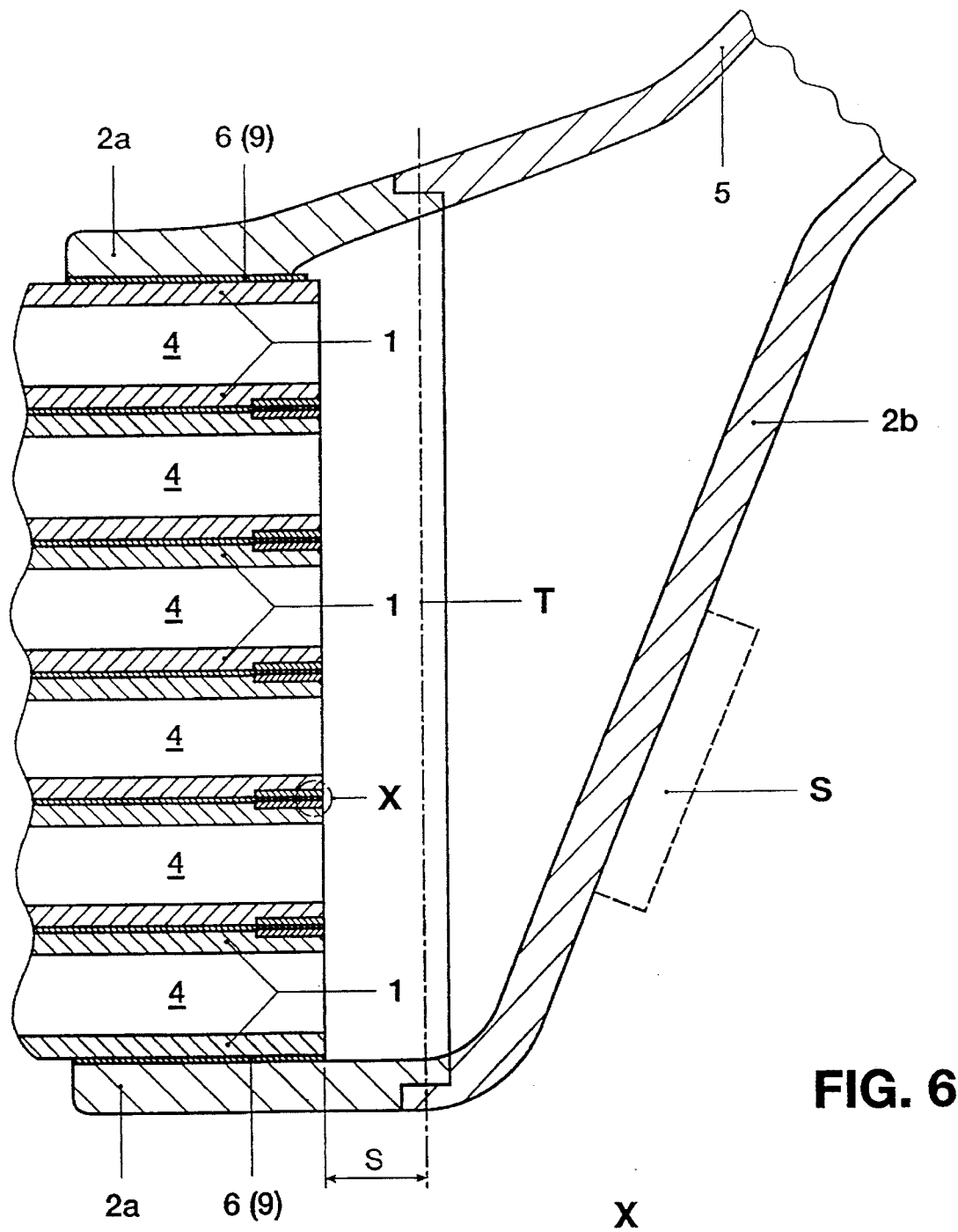
FIG. 5 shows a longitudinal section through a two-piece connecting device as is used for the repair method according to the invention, slots which have been introduced into the end surface of the conductor bar being filled with special filling pieces.

After completion of the inspection and, if appropriate, after reworking of the solder points, the second connecting part 2b is now placed onto the first connecting part 2a, in step j), with the interposition of solder foils (not shown in FIG. 5), and is soldered thereto. Like the first, this second part is also manufactured from solid copper and is brought to the appropriate shape by metal-cutting machining; it is thus not a casting. For reasons of completeness, it should be mentioned at this point that the electrical connection is made to the second connecting part 2b in the case of this and all further variants, and the second connecting part 2b has been prepared with the first, even before the soldering. In order to enlarge those end surfaces of both connecting parts 2a, 2b which are to be soldered to one another, and in order to simplify the mutual adjustment, these connecting parts 2a, 2b are stepped on their end surfaces. The silver solder which is used for this joint can in this case have a lower melting temperature than that used for soldering the first connecting part 2a to the bar end, in order to prevent damage to those silver-solder joints. Silver solders having an increased silver content are used in this case.

Completion of all the solder joints is followed by final inspection according to step k), in which the test for sealing by pressing off using, for example, helium gas, is carried out as well as visual inspection.

In addition to the repair method which has been described in the preceding text and is at the moment regarded as being preferred by the applicant, modifications are possible without departing from the framework covered by the invention. One of these modifications relates in particular to method step g). It is shown, by way of example, in FIGS. 7 to 9.

After the first connecting part 2a has been pushed on, and any remaining gaps between this connecting part 2a and the outer surfaces of the bar end have been filled, "conventional" solder foil strips with a thickness of approximately 01, mm [sic] are inserted into the slots 7. The hollow conductor elements 1 are then widened at their end until the slots 7 which have been milled in step 4 are closed at the end (cf. FIG. 7 in which the slots which are illustrated excessively wide are already filled with silver solder). The remaining critical gaps 8 at the point where four adjacent conductors meet, which gaps 8 cannot be closed by this widening, are now drilled down to a depth of approximately 13 to 15 mm. It has in this case been found that it is sufficient to accomplish this using a drill of 1 to 1.5 mm. Pins 14, which are 13 to 15 mm long and are made of copper round material, are now inserted into these holes (cf. FIGS. 8 and 9), and the gaps are in this way closed. The purpose of this procedure is virtually to close all the gaps in order to create capillaries for the liquid solder into which it can flow and can also remain therein. Steps h) to k) then follow in the indicated manner.

As already mentioned initially, two soldering processes which are successive both in time and in space, must be carried out in the case of the repair method according to the invention. In the case of such a process, there is always the risk of the quality of the preceding soldering being adversely affected during a subsequent soldering process. In the present case, this risk can be avoided on the one hand by suitable selection of the melting point of the silver solder. Another possibility is to design the connecting device, more precisely the position of the separating surfaces of the two connecting parts 2a and 2b, such that the second solder point is as far as possible away from the first, that is to say to enlarge the distance s (cf. FIGS. 5 and 7). However, this is dependent on the structural characteristics at the site of the repair. In the case of connecting devices having a comparatively large extent, as is illustrated schematically in FIG. 10, the separating surface T of the two connecting parts 2a and 2b can be located a very long distance away from the end surface of the conductor bar and towards the connecting fitting 5. However, nothing is changed in the described repair method, at most with the exception that one and the same solder can now be used for both silver-soldering operations.

Figure 11:
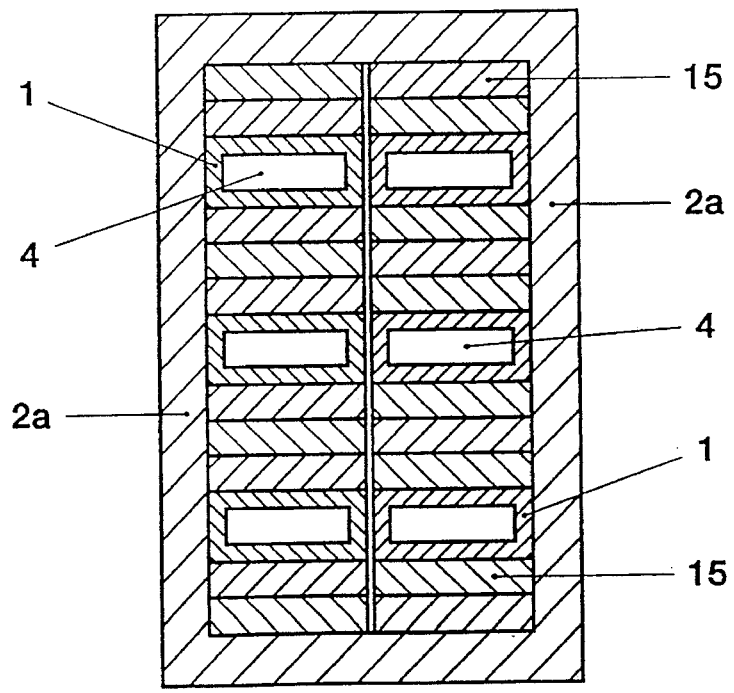
FIG. 11 shows a cross section through the bar end of a stator winding bar which also contains solid conductor elements, as well as hollow conductor elements.

The repair method according to the invention has been described in the preceding text with reference to a conductor bar consisting only of hollow conductor elements 1. It is self-evident that the method is also suitable for stator winding bars which also have solid conductor elements 15 as well as hollow conductor elements 1 (cf. FIG. 11). In the case of such an arrangement, and following the teaching of the invention, after removal of the original connecting device, cleaning of the outer surfaces of the bar end and milling its end flat, narrow slots are introduced between all the conductor elements 1, 15, that is to say also between adjacent hollow and solid conductor elements as well as between two adjacent solid conductor elements 15. The alternative (filling the slots only with solder foil and widening the hollow conductor elements 1) indicated in step g) is admittedly possible here, but depends on the distribution of the hollow conductor elements in the conductor bar itself.

The essential feature in all the design variants of the invention is to ensure in each case that all the earlier solder points are machined down to a predetermined depth seen from the bar end, and can thus be wetted well by the "new" solder, and that all gaps which are too large for the soldering are avoided or filled (capillary soldering).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for repairing a connecting device for the electrical connection and for supplying and carrying away the coolant to and from the conductor elements of the stator winding bars of electrical machines, at least some of said conductor elements being hollow, all the conductor elements being surrounded by a metallic component and being soldered thereto and to one another, which component overhangs the conductor elements forming a water chamber and ends in a connecting fitting for coolant supply and carrying the coolant away, comprising the following method steps:

a) inductive heating and removal of the existing connecting device from the bar end;
b) cleaning the bar end in the region where the new connecting device is intended to be mounted;
c) material-cutting machining the end surface of the bar end;
d) introducing narrow slots between adjacent conductor elements into the end of the bar in the transverse direction and vertical direction;
e) pushing on a first connecting part which is made of copper and completely surrounds the bar end;
f) filling remaining gaps between the first connecting part and the outer surfaces of the bar end with copper foil and/or solder foil;
g) filling the narrow slots, which have been introduced into the end of the bar, with copper foil and/or solder foil or a combination of both;
h) inductive heating of the first connecting part and of the bar end and soldering with the addition of solder;
i) at least visual inspection of the solder joint thus created;
j) fitting a second connecting part made of copper to the free end surface of the first connecting part by soldering;
k) testing the sealing of the resulting connecting device.

2. The method as claimed in claim 1, wherein the slots which are introduced between the conductor elements are filled with strips which have a central copper layer which is provided with solder foil on both sides.

3. The method as claimed in claim 1, wherein only solder foil is inserted into the said slots and the hollow ones of said conductor elements are then subsequently widened until adjacent hollow conductor elements touch at the edges, and wherein the remaining gaps are filled with copper pins at the points at which four hollow conductor elements meet.

4. The method as claimed in claim 3, wherein the remaining gaps are drilled in advance at the points at which four hollow conductor elements meet.

* * * * *